US009230310B2

(12) United States Patent
Black et al.

(10) Patent No.: US 9,230,310 B2
(45) Date of Patent: Jan. 5, 2016

(54) IMAGING SYSTEMS AND METHODS FOR LOCATION-SPECIFIC IMAGE FLARE MITIGATION

(71) Applicant: Semiconductor Components Industries, LLC, Phoeniz, AZ (US)

(72) Inventors: Robert A. Black, Milpitas, CA (US); Jonathan Michael Stern, San Carlos, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 142 days.

(21) Appl. No.: 14/092,501

(22) Filed: Nov. 27, 2013

(65) Prior Publication Data

US 2015/0146014 A1    May 28, 2015

(51) Int. Cl.
*H04N 17/00* (2006.01)
*G06T 5/00* (2006.01)
H04N 5/217 (2011.01)
G06T 7/00 (2006.01)

(52) U.S. Cl.
CPC .............. *G06T 5/008* (2013.01); *G06T 7/0018* (2013.01); *H04N 5/217* (2013.01); *H04N 17/002* (2013.01)

(58) Field of Classification Search
CPC .... G06T 5/008; G06T 7/0018; H04N 17/002; H04N 5/217
USPC .......................................................... 348/187
See application file for complete search history.

(56) References Cited

U.S. PATENT DOCUMENTS

| 6,088,059 | A  | * | 7/2000 | Mihara et al. ................. 348/335 |
| 6,373,993 | B1 | * | 4/2002 | Nomura ......................... 382/274 |
| 6,912,321 | B2 |   | 6/2005 | Gindele |
| 6,985,270 | B1 |   | 1/2006 | Keech et al. |
| 2002/0110376 | A1 | * | 8/2002 | MacLean et al. ............. 396/429 |
| 2003/0179948 | A1 | * | 9/2003 | Gindele ......................... 382/274 |
| 2008/0055601 | A1 |   | 3/2008 | Ovsiannikov |
| 2013/0169859 | A1 |   | 7/2013 | Kawakami et al. |

\* cited by examiner

*Primary Examiner* — Michael Lee
(74) *Attorney, Agent, or Firm* — Treyz Law Group, P.C.; Michael H. Lyons (57) ABSTRACT

An imaging system may include a camera module with an image sensor having an array of image sensor pixels and one or more lenses that focus light onto the array. The system may include processing circuitry configured to mitigate flare artifacts in image data captured using the array based on at least one image flare map. The image flare map may identify a portion of the captured image data on which to perform image flare mitigation operations. The processing circuitry may perform image flare mitigation operations such as pixel value desaturation on the identified portion of the captured image data without desaturating portions of the image data that do not include flare artifacts. The flare map may be generated using a calibration system that characterizes the location, intensity, and color of all possible image flare artifacts that may be generated by the imaging system during normal imaging operations.

20 Claims, 8 Drawing Sheets

IMAGING SYSTEMS AND METHODS FOR LOCATION-SPECIFIC IMAGE FLARE MITIGATION

BACKGROUND

This relates generally to imaging devices, and more particularly, to imaging devices with stored calibration data for mitigating image flare artifacts.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals from the image pixels.

Light from objects in the field-of-view of an imaging system is typically focused onto the array of image pixels during image capture operations. In some situations, light from a light source that is inside or outside of the field-of-view can enter the imaging system at a large angle of incidence or may travel along another path that results in multiple reflections within the optical system. This type of unwanted light can be reflected from one or more surfaces at which there are changes in refractive index in the imaging system before being absorbed by image pixels in the array, thereby generating flare artifacts in captured images.

It would therefore be desirable to be able to provide imaging devices with improved means of capturing and processing image signals.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds, thousands, millions or more). A typical image sensor may, for example, have hundreds of thousands or millions of pixels (e.g., megapixels). Image sensors may include control circuitry such as circuitry for operating the image pixels, readout circuitry for reading out image signals corresponding to the electric charge generated by the photosensitive elements, and, if desired, other processing circuitry such as analog processing circuitry and digital processing circuitry. An image sensor may be coupled to additional processing circuitry such as circuitry on a companion chip to the image sensor, circuitry in the device that is coupled to the image sensor by one or more cables or other conductive lines, or external processing circuitry.

Figure 1:
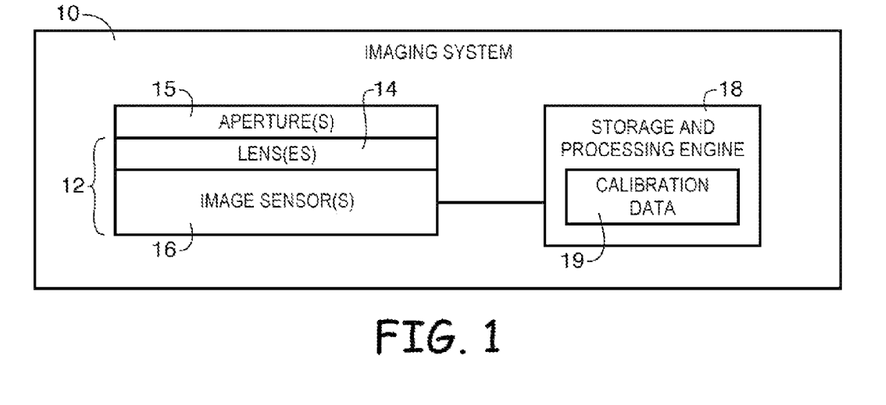
FIG. 1 is a diagram of an illustrative electronic device having an imaging system with an image sensor and processing circuitry with calibration data for mitigating image flare in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device or imaging system that captures digital image data. Camera module 12 may be used to convert incoming light into electric charges and eventually into digital image data. Camera module 12 may include one or more lenses 14 and image sensor circuitry 16 (e.g., one or more corresponding image sensors 16). If desired, camera module 12 may include one or more apertures 15 that pass light from a scene onto image sensor 16 (e.g., through lenses 14). The example of FIG. 1 is merely illustrative. If desired, aperture 15 may be formed over lenses 14, interspersed between different lenses 14, interposed between lenses 14 and image sensor 16, or at any other desired location in camera module 12. Aperture 15 may be fixed or may be adjustable (e.g., camera module 12 may adjust the size of aperture 15 so that a given amount of light is transmitted through the aperture onto image sensor 16). During image capture operations, light from a scene may be focused onto image sensor 16 by lens 14. Image sensor 16 may include circuitry for converting analog pixel data into corresponding digital image data to be provided to processing circuitry 18. If desired, camera module 12 may be provided with an array of lenses 14 and an array of corresponding image sensors 16 and/or apertures 15.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image sensor 16 may receive control signals from storage and processing circuitry 18 and may supply pixel data (e.g., image data that includes multiple pixel values) to storage and processing circuitry 18. Image data that has been captured by camera module 12 may be processed and stored using processing circuitry 18. Processed image data may, if desired, be provided to external equipment (e.g., a computer, external processing circuitry, a display, or other device) using wired and/or wireless communications paths coupled to processing circuitry 18.

If desired, calibration data 19 may be stored on storage and processing circuitry 18. Calibration data 19 may, for example, include instructions for performing image processing operations on image data received from image sensor 16, instructions for supplying control signals to image sensor 16, or any other desired calibration information for performing image capture and processing operations using device 10. Calibration data 19 may be generated and stored on storage and processing circuitry 18 prior to normal operations of device 10 (e.g., calibration data 19 may be generated during manufacture of image sensor 16, during factory calibration of image sensor 16, during assembly of device 10, during factory testing of camera module 12, etc.).

Figure 2:
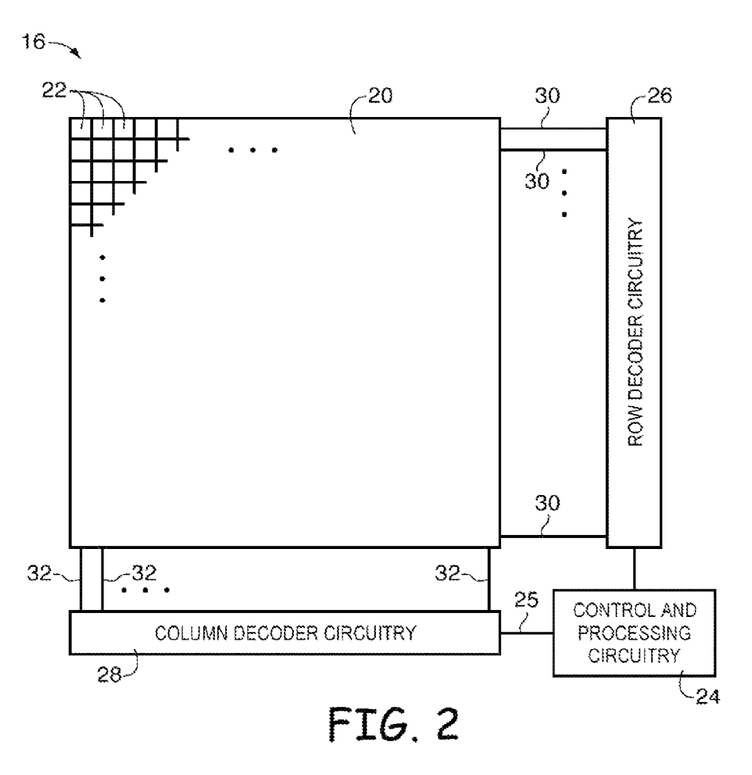
FIG. 2 is a diagram of an illustrative pixel array and associated control circuitry for reading out pixel data from image pixels along column lines in an image sensor in accordance with an embodiment of the present invention.

As shown in FIG. 2, image sensor 16 may include control and processing circuitry 24 and a pixel array 20 containing image sensor pixels 22 (sometimes referred to herein as image pixels 22). Array 20 may contain, for example, hundreds or thousands of rows and columns of image sensor pixels 22. Control circuitry 24 may be coupled to row decoder circuitry 26 and column decoder circuitry 28. Row decoder circuitry 26 may receive row addresses from control circuitry 24 and supply corresponding row control signals such as reset, row-select, transfer, and read control signals to pixels 22 over control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. During pixel readout operations, a pixel row in array 20 may be selected using row decoder circuitry 26 and image data associated with image pixels 22 in that pixel row can be read out along column lines 32.

Column decoder circuitry 28 may include sample-and-hold circuitry, amplifier circuitry, analog-to-digital conversion circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. Readout circuitry such as signal processing circuitry associated with column decoder circuitry 28 (e.g., sample-and-hold circuitry and analog-to-digital conversion circuitry) may be used to supply digital image data to control and processing circuitry 24 and/or processor 18 (FIG. 1) over path 25 for pixels in chosen pixel columns.

If desired, image sensor 16 may capture images using selected image capture settings such as exposure time settings, gain settings, and aperture size settings. Control circuitry 24 may receive control signals from processing circuitry 18 that identify image capture settings for use by image sensor 16 during image capture operations. Control circuitry 24 may provide control signals to row decoder circuitry 26 and column decoder circuitry 28 that identify the image capture settings with which to capture images from the scene. For example, control and processing circuitry may instruct array 22 (e.g., by providing appropriate pixel control signals to row decoder circuitry 26 and column decoder circuitry 28) to integrate charge for a selected exposure time before the integrated charge is read out from array 22. Control circuitry 24 may instruct column decoder circuitry 28 to provide a selected gain to image signals read out from pixels 22. If desired, control circuitry 24 and/or control circuitry 18 may provide control signals to aperture 15 (FIG. 1) to adjust the size of aperture 15 (e.g., so that a desired amount of light is transmitted through aperture 15). This example is merely illustrative. If desired, image sensor 16 may capture images using any desired image capture settings (e.g., exposure settings, gain settings, aperture settings, color temperature settings, frame rate settings, image light polarization, ambient brightness value, color correction settings, etc.).

Figure 3:
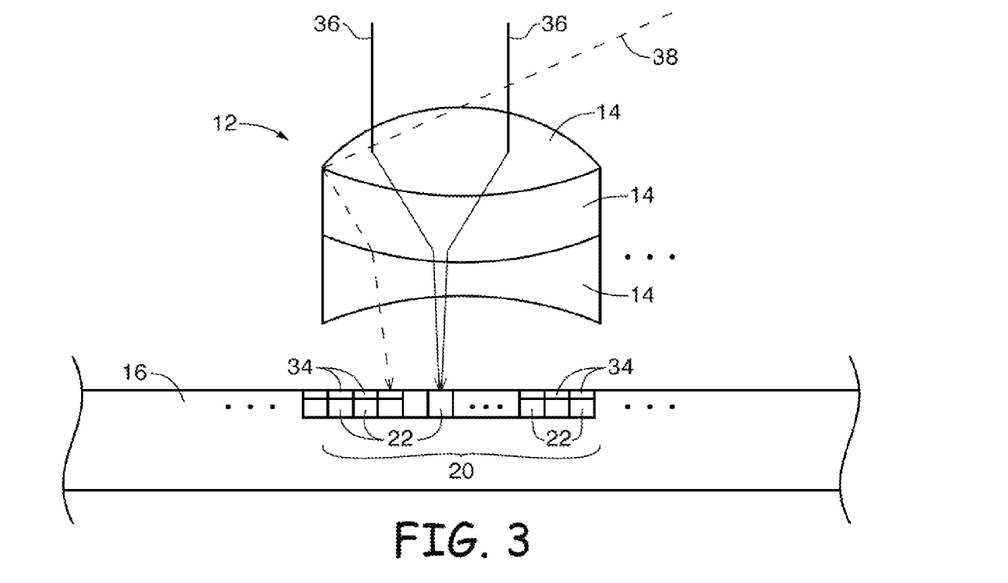
FIG. 3 is cross-sectional side view of an illustrative camera module showing how image light and stray light may pass through one or more lenses onto an image pixel array in accordance with an embodiment of the present invention.

As shown in FIG. 3, image sensor pixels 22 in pixel array 20 may be covered by a color filter array that includes color filter elements 34 over some or all image pixels 22. Color filter elements 34 may be red color filter elements (e.g., material that passes red light while reflecting and/or absorbing other colors of light), blue color filter elements (e.g., material that passes blue light while reflecting and/or absorbing other colors of light), green color filter elements (e.g., material that passes green light while reflecting and/or absorbing other colors of light), clear color filter elements (e.g., transparent material that passes red, blue and green light), infrared color filter elements (e.g., material that passes infrared light while reflecting and/or absorbing visible light), or any other desired color filter elements. If desired, color filter elements 34 may be formed over image pixels 22 in a repeating pattern of unit cells. Each unit cell may include color filter elements of different colors (e.g., each unit cell may include two clear color filter elements, a red color filter element, and a blue color filter element, each unit cell may include two green color filter elements, a blue color filter element, and a red color filter element arranged in a Bayer pattern, each unit cell may include only blue color filter elements, only clear color filter elements, etc.). If desired, some or all of image pixels 22 may be provided without any color filter elements. Image pixels that are free of color filter material and image pixels that are provided with clear color filters may be referred to herein as clear pixels, white pixels, clear image pixels, or white image pixels. Image pixels 22 having a red color filter may sometimes be referred to herein as red image pixels or red pixels, image pixels 22 having a blue color filter may sometimes be referred to herein as blue image pixels or blue pixels, and image pixels 22 having a green color filter may sometimes be referred to herein as green image pixels or green pixels.

As shown in FIG. 3, one or more lenses 14 (e.g., convex lenses, concave lenses, or other lenses) may focus light such as image light 36 onto image pixels 22. If desired, one or more lenses 14 may be adjustable or may be fixed in position. Image light 36 originates within the field-of-view of camera module 12. Image light 36 follows a predictable path through lenses 14 onto image sensor 16.

In some situations, light that originates outside the field-of-view of camera module 12 such as stray light 38 may find a path through some or all of lenses 14 and onto image sensor 16. In other situations, light that originates within the field-of-view of camera module 12 can also generate stray light 38 (e.g., light may encounter one or more changes in refractive index within camera module 12 such as interfaces between air and plastic or glass that cause some light to be reflected back from the interface and eventually onto the image sensor via multiple reflection paths). In the example of FIG. 2, stray light 38 reflects from an edge of upper lens 14 and reflects through lower lens 14 onto image pixels 22. However, this is merely illustrative. Stray light from, for example, a bright light source such as the sun, the moon, a street light, a light bulb, etc. may take various paths onto image sensor 16. In this way, image artifacts such as flare artifacts or ghost artifacts may be generated in images captured by image pixels that are affected by the stray light.

Processing circuitry such as processing circuitry 18 (FIG. 1) may be configured to detect color or brightness differences related to this type of flare artifact in image data from image pixels 22 and, if desired, may perform flare-mitigation operations on captured image data. Because of differences in pixel architecture for adjacent image pixels 22 in a pixel array 20, differences between color filter elements 22 for neighboring pixels 22, and/or potentially large angles at which stray light 28 may be incident on image pixels 22, flare artifacts may have a particular color. For example, a photon of high incident angle stray light can pass through a color filter of a given image pixel, can be modified by that color filter, and can be absorbed by an adjacent photosensor (e.g., a photodiode of an adjacent image pixel). This can contribute portions of an image signal to the wrong color, resulting in a possible color shift in the flare artifact. For this reason, an image signal from a green pixel that is adjacent to a red pixel may, for example, be brighter (or fainter) than an image signal from a green pixel that is adjacent to a blue pixel. In one particular example, which is sometimes described herein, this type of brightness difference gives rise to flare artifacts having a purple color.

Image artifacts such as image flare artifacts may be generated at particular locations and with particular shapes in images captured by image sensor 16. The location and shape of flare artifacts in the captured images may be dependent upon the particular design of lenses 14, camera module 12, image sensor 16, and/or manufacturing variations and asymmetries in lenses 14, camera module 12, and/or image sensor 16. For example, devices 10 having different configurations of lenses 14 may have different flare artifact shapes and/or locations in captured images (e.g., a camera module 12 having a convex lens and a concave lens may produce images having flare artifacts as a first location in captured images, whereas a camera module 12 having two concave lenses and two convex lenses may produce images having flare artifacts at a second location in captured images, etc.). As another example, two devices 10 having the same configuration of lenses 14 may have different flare artifact shapes and/or locations in captured images because variations in lenses 14 during manufacture of camera module 12 may cause slight differences in the shapes and arrangements of lenses 14 in camera modules 12.

In some imaging devices, image flare artifacts (sometimes referred to herein as flare artifacts) are mitigated by applying false color neutralization across the entire image. For example, an offset pixel value may be subtracted from pixel values generated by each pixel across the pixel array. However, performing uniform image flare artifact mitigation across the entire pixel array can generate additional image artifacts in the final image. For example, some imaging devices identify a specific color in a captured image that matches the expected color of a flare artifact and that color is subsequently desaturated across the pixel array. While desaturating a particular color across the pixel array can reduce the visual effect of an image flare, any objects in the image that have a color that is similar to the color of the flare artifact may also be desaturated, resulting in additional color artifacts in the final image. It may therefore be desirable to provide improved image flare mitigation capabilities.

In one suitable embodiment of the present invention, processing circuitry 18 may store information about the expected location of image flare artifacts generated by image sensor 16. For example, processing circuitry 18 may store one or more image flare maps (sometimes referred to herein as image flare artifact maps, image flare artifact masks, image flare masks, flare masks, image flare calibration masks, or flare calibration maps) that identify regions (portions) of the field of view of image sensor 16 that are likely to have image flare artifacts when images are captured (e.g., image flare maps stored at processing circuitry 18 may identify regions or portions of images captured by image sensor 16 that have a high probability of including an image flare artifact). As an example, image flare maps may be stored as a part of calibration data 19 on processing circuitry 18 (e.g., image flare maps stored on processing circuitry 18 may be generated and stored on circuitry 18 during calibration of device 10). Image flare maps stored at circuitry 18 may, for example, include greyscale maps that identify the probability and/or the expected intensity (brightness) of image flare artifacts generated in images captured by image sensor 16 (e.g., lighter portions of the greyscale flare map may correspond to regions of the captured image that have a high probability of containing intense image flare artifacts whereas darker portions of the greyscale image flare map may correspond to regions of the captured image that have a low probability of containing image flare artifacts).

Flare artifact characteristics such as the flare artifact intensity in a captured image may depend on the image capture settings with which the image sensor 16 captured the image (e.g., exposure time, gain, aperture size, etc.). For example, a first image captured by image sensor 16 using a first exposure time, a first gain, and/or a first aperture size may have flare artifacts with a first set of flare characteristics (e.g., a first intensity) whereas a second image captured by image sensor 16 using a second exposure time, a second gain, and/or aperture size may include flare artifacts with a second set of flare artifact characteristics (e.g., a second intensity). Processing circuitry 18 may characterize the location and expected intensity of image flare artifacts in images captured under a variety of imaging conditions (e.g., under a variety of image capture settings). If desired, each image flare map may include corresponding metadata that identifies the image capture settings for which the image flare map is to be used when mitigating flare. If desired, processing circuitry 18 may store respective image flare maps that each correspond to a particular color image flare artifact (e.g., processing circuitry 18 may store a first set of flare maps corresponding to purple flare artifacts, a second set of flare maps corresponding to blue flare artifacts, etc.) or may store a single flare map that identifies flare artifact color in the metadata associated with the flare map. Processing circuitry 18 may retrieve the stored image flare maps and may apply the image flare maps to image data captured by image sensor 16 while performing image flare mitigation operations.

Figure 4:
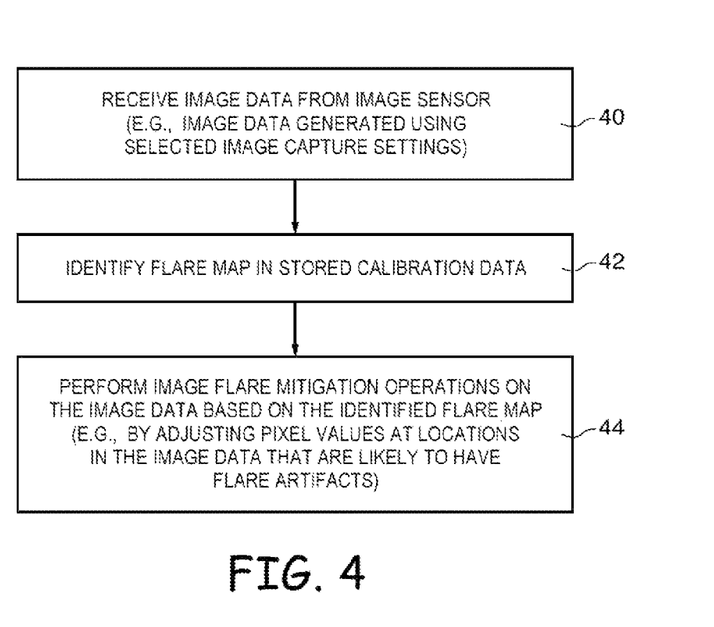
FIG. 4 is a flow chart of illustrative steps that may be performed by processing circuitry in an imaging system to compensate for image flare artifacts in captured images using an image flare map in accordance with an embodiment of the present invention.

Illustrative steps that may be performed by storage and processing circuitry 18 for performing location-specific flare mitigation operations are shown in FIG. 4. The steps of FIG. 4 may, for example, be performed after calibration data such as calibration data 19 of FIG. 1 has been loaded onto storage and processing circuitry 18 (e.g., during normal imaging operations by an end user of device 10) and after image sensor 16 captures image data from a scene (e.g., using one or more selected image capture settings such as gain, exposure time, aperture size, etc.).

At step 40, processing circuitry 18 may receive image data from image sensor 16. The image data may include one or more images (e.g., image frames of pixel values). If desired, processing circuitry 18 may identify image capture settings such as aperture size, gain, and exposure time with which the image data was captured. For example, image sensor 16 may provide metadata to processing circuitry 18 that identifies the corresponding image capture settings.

At step 42, processing circuitry 18 may identify an image flare map to apply to the image data for mitigating image flare. For example, processing circuitry 18 may retrieve a selected flare map from calibration data 19 that corresponds with the image capture settings associated with the received image data (e.g., processing circuitry 18 may select a flare map having metadata that matches the metadata associated with the received image data). As an example, if the received image data includes metadata that identifies that the image data was captured using a predetermined aperture size, gain, and/or exposure time, processing circuitry 18 may select a flare map from calibration data 19 that corresponds to the predetermined aperture size, gain, and/or exposure time. As another suitable example, processing circuitry 18 may retrieve a single flare map from calibration data 19 that includes exposure time, gain, and aperture size information (e.g., stored in metadata associated with the flare map) for each pixel location. In this example, processing circuitry 18 may account for the associated exposure time, gain, and aperture information when performing image flare mitigation operations (e.g., when determining an amount of desaturation to provide for each pixel value).

At step 44, processing circuitry 18 may perform location-specific image flare mitigation operations on the received image data based on the identified image flare map. Processing circuitry 18 may apply the identified flare map to the received image data while adjusting the image data to mitigate image flare. The identified image flare map may identify the probability of image flare artifacts occurring at one or more locations in the image data. If desired, processing circuitry may perform image flare mitigation operations on locations in the received image data that are identified by the image flare map as being likely to include image flare artifacts. For example, processing circuitry 18 may desaturate (e.g., attenuate) pixel values of one or more colors at locations identified in the flare map as being likely to include image flare artifacts (e.g., at locations identified by the image flare map as having a probability of including image flare artifacts that exceeds a predetermined minimum probability value or threshold).

If desired, the amount of image flare mitigation (e.g., pixel value desaturation) that is performed on a particular pixel value in the image data may depend on the probability identified by the flare map of that pixel value having a flare artifact. For example, processing circuitry 18 may desaturate pixel values at locations in the image data that are identified in the flare map as having a higher probability of including image flare artifacts more than pixel values at locations in the image data that are identified in the flare map as having a lower probability of including image flare artifacts (e.g., processing circuitry 18 may desaturate pixel values at locations corresponding to brighter portions of the greyscale flare map than pixel values at locations corresponding to darker portions of the greyscale flare map). If desired, processing circuitry 18 may desaturate pixel values of a selected color at locations in the image data that are identified by the flare map as being likely to include flare artifacts. For example, processing circuitry 18 may only desaturate pixel values of a given color that matches the color of an expected flare artifact at the corresponding pixel value locations (e.g., if the metadata associated with the identified flare map identifies a flare artifact color for a set of pixel value locations, processing circuitry 18 may desaturate that color when adjusting pixel values in the image data at those pixel value locations).

If desired, processing circuitry 18 may omit image flare mitigation operations for pixel values at locations in the image data that are identified by the flare map as having a suitably low probability of including image flare artifacts (e.g., processing circuitry 18 may leave pixel values unchanged for locations of the image data that correspond to a probability of including image flare artifacts that is below a predetermined threshold). In other words, processing circuitry 18 may only desaturate pixel values in the received image data that have a sufficient probability of including flare artifacts (e.g., flare artifacts of a particular color). In this way, processing circuitry 18 may perform location-specific image flare mitigation operations to adjust pixel values at certain locations in the image without forming color artifacts at other locations in the image (e.g., locations that do not include image flare artifacts).

The example in which processing circuitry 18 performs image flare mitigation by desaturating pixel values is merely illustrative. If desired, processing circuitry 18 may perform any desired image flare mitigation operations on the image data (e.g., by replacing pixel values with modified or adjusted pixel values, with other pixel values in the image data, with interpolated pixel values, by changing the color of the pixel values at the flare artifact to a flat grey or white color, by applying a flare-specific color correction matrix, by performing a texture replacement, etc.). In general, processing circuitry 18 may perform image flare mitigation operations at locations in the image data (e.g., regions of the captured image) that have a sufficient probability of including image flare artifacts (e.g., at locations in the flare map that correspond to a probability that exceeds a minimum probability value threshold) while leaving pixel values at other locations in the image data unchanged. In this way, processing circuitry 18 may mitigate image flare artifacts in the image data without generating color artifacts in regions of the image data that do not include image flare artifacts.

Figure 5:
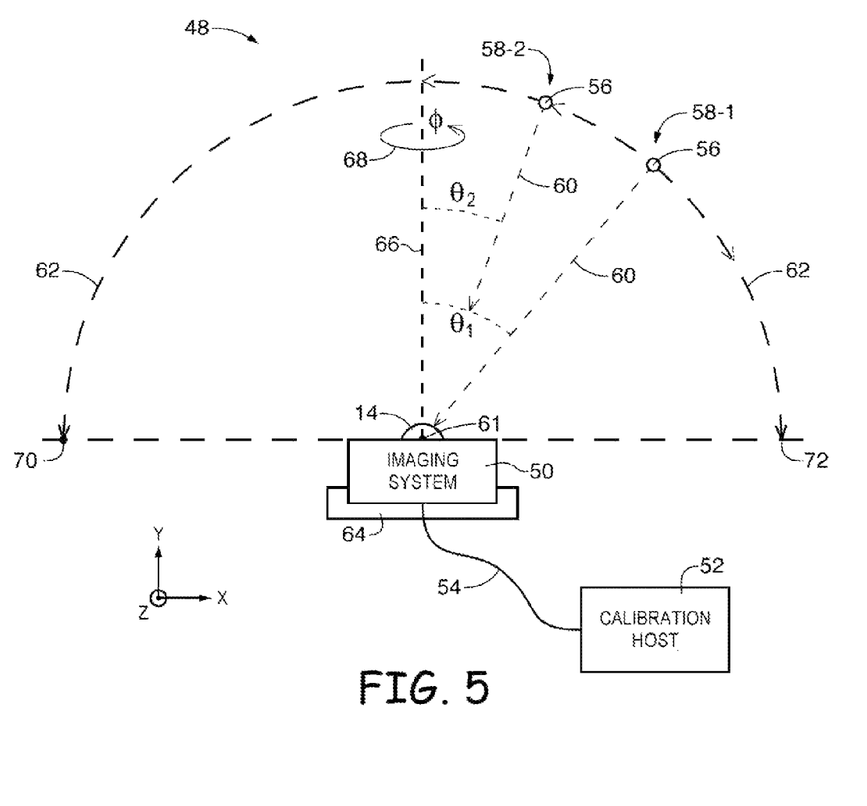
FIG. 5 is a diagram of an illustrative calibration system for generating image flare maps that can be used by an imaging system to perform location-dependent image flare mitigation operations in accordance with an embodiment of the present invention.

Image sensor 16 may be tested and calibrated using a calibration system for generating calibration data 19 (FIG. 1). For example, the calibration system may be used to generate one or more image flare maps for storing on device 10. As shown in FIG. 5, an imaging system 50 may be calibrated using calibration system 48. Imaging system 50 may, for example, include a fully assembled electronic device such as electronic device 10 or a partially assembled electronic device (e.g., imaging system 50 may include some or all of image sensor 16, camera module 12, and/or processing circuitry 18 during manufacture of image sensor 16, camera module 12, processing circuitry 18 and/or device 10, prior to the assembly of device 10, etc.). Imaging system 50 may be calibrated prior to normal device operation (e.g., normal operation of device 10 by an end user).

Imaging system 50 may be coupled to calibration host 52 (e.g., a personal computer, laptop computer, tablet computer, handheld computing device, etc.) over path 54. Path 54 may be a wired connection (e.g., one or more cables for passing data) or may be a wireless connection over which data is conveyed. Imaging system 50 may be operated directly or via computer control (e.g., using control signals received from calibration host 52). Calibration host 52 may include storage circuitry and processing circuitry (not shown). Calibration host 52 may communicate with imaging system 50 by sending and receiving control signals over data path 54. Calibration host 52 (e.g., software running autonomously or semi-autonomously on calibration host 52) may, for example, provide calibration control signals that instruct imaging system 50 to perform desired imaging operations (e.g., that instruct imaging system 50 to capture images with desired image capture settings, to transmit captured image data to host 52, etc.). Imaging system 50 may transmit captured image data, associated metadata, control signals, and/or any other desired signals to calibration host 52 over path 54.

Calibration system 50 may include one or more light sources 56. Light source 56 may, for example, include a light-emitting diode, laser, point light source, or any other desired light source of any desired color. During calibration operations, light source 56 may emit light 60 towards imaging system 50. Light source 56 may be placed at a selected location relative to imaging system 50 so that emitted light 60 is received by imaging system 50 at a desired angle of incidence. For example, the position of light source 56 may be rotated in the X-Y of FIG. 5 about point 61 (as shown by arrows 62) and/or may be rotated in the Z-X plane around normal axis 66 (as shown by arrow 68) so that emitted light 60 is incident upon imaging system 50 with a selected angle θ with respect to normal axis 66 (e.g., a first incident angle $\theta_1$, a second incident angle $\theta_2$, etc.) and with a selected transverse angle φ. In another suitable arrangement, multiple light sources 56 may be formed on an array of light sources and each light source in the array may be selectively illuminated so that emitted light 60 is incident upon imaging system 50 at a desired angle of incidence.

If desired, imaging system 50 may be mounted to calibration mounting structure 64. In the example of FIG. 5, imaging system 50 and mounting structure 64 are fixed and the position of light source 56 is adjusted so that imaging system 50 receives emitted light 60 at a desired angle of incidence. In another suitable arrangement, light source 56 may be fixed in position and mounting structure 64 may be adjusted to rotate imaging system 50 so that light 60 from light source 56 is received at the desired angle of incidence. In general, the position of light source 56 and/or imaging system 50 may be rotated so that emitted light 60 is incident upon imaging system 50 at the desired incident angle θ and the desired transverse angle φ. Light source 56 and/or imaging system 50 may be rotated manually (e.g., by a calibration system operator) or autonomously (e.g., by automated motor systems, etc.).

Calibration system 48 may be used to generate one or more image flare maps for identifying regions of the field of view of imaging system 50 (e.g., image sensor 16) that have a non-zero probability of including image flare artifacts during normal device operation. The location of image flare artifacts in image data captured by imaging system 50 may depend on incident angle θ and/or transverse angle φ of emitted light 60 upon lens 14 of imaging system 50. For example, imaging system 50 may generate an image flare artifact at a first location in the image data in response to light 60 when received at first incident angle $\theta_1$, whereas imaging system 50 may generate an image flare artifact at a second location in the image data in response to light 60 received at a second incident angle $\theta_2$.

Calibration system 48 may characterize image flare artifacts in image data captured by imaging system 50 for light received at multiple angles of incidence (e.g., incident angles θ and/or transverse angles φ). During calibration operations, imaging system 50 may capture image data from light source 56 at some or all incident angles θ and some or all transverse angles φ. For example, the position of light source 56 may be adjusted along arrows 62 from position 70 to position 72 so that imaging system 50 receives light 60 at all incident angles θ from zero to 180 degrees and the position of light source 56 may be adjusted around normal axis 66 so that imaging system 50 receives light 60 at all transverse angles φ around normal axis 66. In this way, imaging system 50 may capture image data in response to light 60 received for all possible source locations of stray light received by imaging system 50. Imaging system 50 may thereby generate image data having all of the possible stray light artifacts that can form during normal imaging operations using imaging system 50 (e.g., since incoming light at all possible angles is received by imaging system 50). Imaging system 50 may generate one or more image flare maps based on the captured image data.

Calibration system 48 may provide the captured image data to host 52. Host 52 may process the image data to characterize image flare artifacts in the received image data. Host 52 may identify flare artifact parameters (e.g., flare artifact location, color information, etc.) associated with light received from possible angle of incident light 60. For example, host 52 may perform image flare artifact detection operations to detect the location of image flare artifacts generated by imaging system 50 in response to light 60 from some or all possible angles θ and φ. Flare artifact parameters identified by host 52 may sometimes be referred to herein as flare artifact information.

Figure 6:
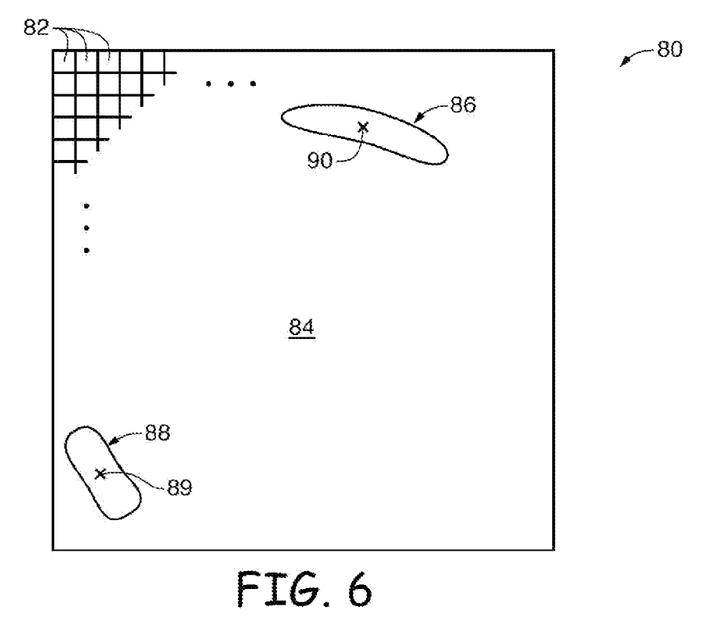
FIGS. 6 and 7 are illustrative diagrams of images that may be captured from light at different incident angles using an image sensor in a calibration system of the type shown in FIG. 5 for generating image flare maps in accordance with an embodiment of the present invention.

FIG. 6 is an illustrative diagram of an image that may be captured by imaging system 50 during calibration operations. As shown in FIG. 5, imaging system 50 may generate image 80 of pixel values 82 (e.g., pixel values generated by corresponding image pixels 22 in image sensor array 20 on imaging system 50). Imaging system 50 may, for example, generate image data 80 while light source 56 is at first location 58-1 as shown in FIG. 5 (e.g., while incoming light 60 is at incident angle $\theta_1$).

Image 80 may be formed from image light such as light 36 (see FIG. 3) and, in some situations, stray light such as stray light 38. Image data 80 generated by image pixels 22 may therefore include flare artifacts such as flare artifacts 86 and 88 and background image data such as background image 84. If desired, a black screen may be placed behind light source 56 in calibration system 48 so that background image 84 is black (e.g., so that pixel values 82 corresponding to background image 84 may have a magnitude that is approximately zero). Flare artifact 86 may be centered at location 90 in image data 80 and flare artifact 88 may be centered at location 89 in image data 80. Calibration host 52 may store image 80 for generating one or more flare maps. Calibration host 52 may store metadata associated with image data 80 that identifies the image capture settings with which image data 80 was captured by imaging system 50. If desired, host 52 may identify color information associated with flare artifacts 86 and 88 and may store the identified color information in the associated metadata.

Figure 7:
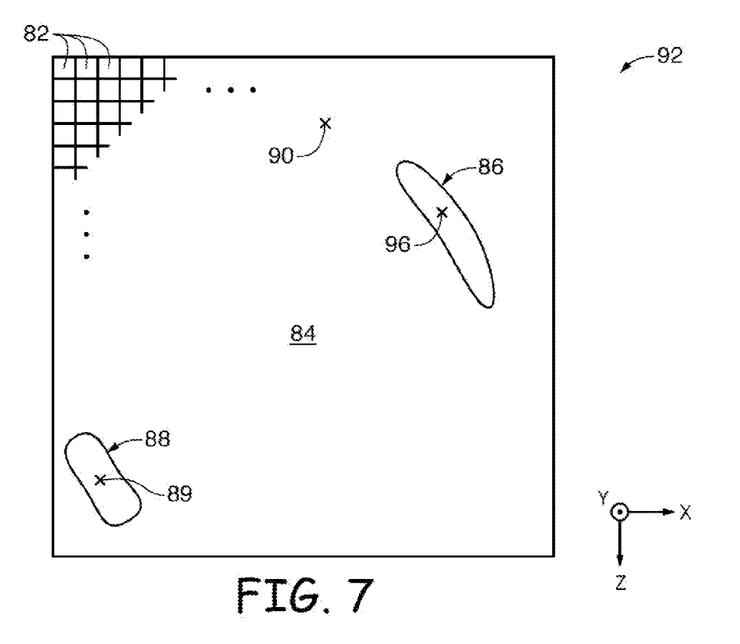

FIG. 7 is an illustrative diagram of another image that may be captured by imaging system 50 during calibration operations. As shown in FIG. 7, imaging system 50 may generate image 92 of pixel values 82. Imaging system 50 may, for example, generate image 92 while light source 56 is at second location 58-2 as shown in FIG. 5 (e.g., while incoming light 60 is at incident angle $\theta_2$). Image data 92 may include flare artifacts such as flare artifacts 86 and 88 and background image data such as background image 84. Flare artifact 86 may be centered at location 96 in image data 92 and rotated relative to artifact 86 in image data 80 (e.g., location 96 may be displaced relative to image flare location 90 in image data 80), whereas flare artifact 88 may be centered at the same location 89 as in image data 80. Calibration host 52 may store metadata associated with image data 92 that identifies the image capture settings with which image data 80 was captured by imaging system 50. If desired, host 52 may identify color information associated with flare artifacts 86 and 88. Flare artifact 86 may, for example, be rotationally symmetric (e.g., rotationally symmetric around normal axis 66 that lies along the y-axis of FIGS. 6 and 7). As the position of light source 56 is adjusted, flare artifact 86 may change position and orientation in a rotationally symmetric manner across the captured images. Calibration host 52 may combine image data 92 with image data 80 (FIG. 6) to generate one or more image flare maps.

In the example of FIGS. 6 and 7, the location and shape of flare artifact 86 depends on the angle with which incoming light 60 is received by imaging system 50, whereas the location and shape of flare artifact 88 is independent of the angle with which incoming light 60 is received). The examples of FIGS. 6 and 7 are merely illustrative. Image data captured by imaging system 50 may have any number of flare artifacts of any shape, symmetry, size, color, and intensity having either a fixed location or a location that is dependent upon the incident angle of incoming light 60. Image data captured by imaging system 50 in response to light received at a given angle may include additional or fewer image flare artifacts than image data captured in response to light received at a different angle.

Imaging system 50 may gather image data for some or all possible locations of light source 56 (e.g., for some or all possible angles of incidence). Calibration host 52 may combine each image captured by imaging system 50 to generate one or more flare maps. For example, host 52 may accumulate image data from each image (e.g., from each image captured from light source 56 at a different location) to generate one or more flare maps for use during normal operation of imaging system 50 for performing location-specific image flare mitigation operations. When image data is gathered in response to light received at all possible angles of incidence and the image data is accumulated to generate image flare maps, the image flare maps may characterize all possible image flare artifacts that may be formed by imaging system 50 during normal imaging operations (e.g., because all possible flare artifacts that may arise during imaging with imaging system 50 are generated and characterized when generating the flare maps).

Figure 8:
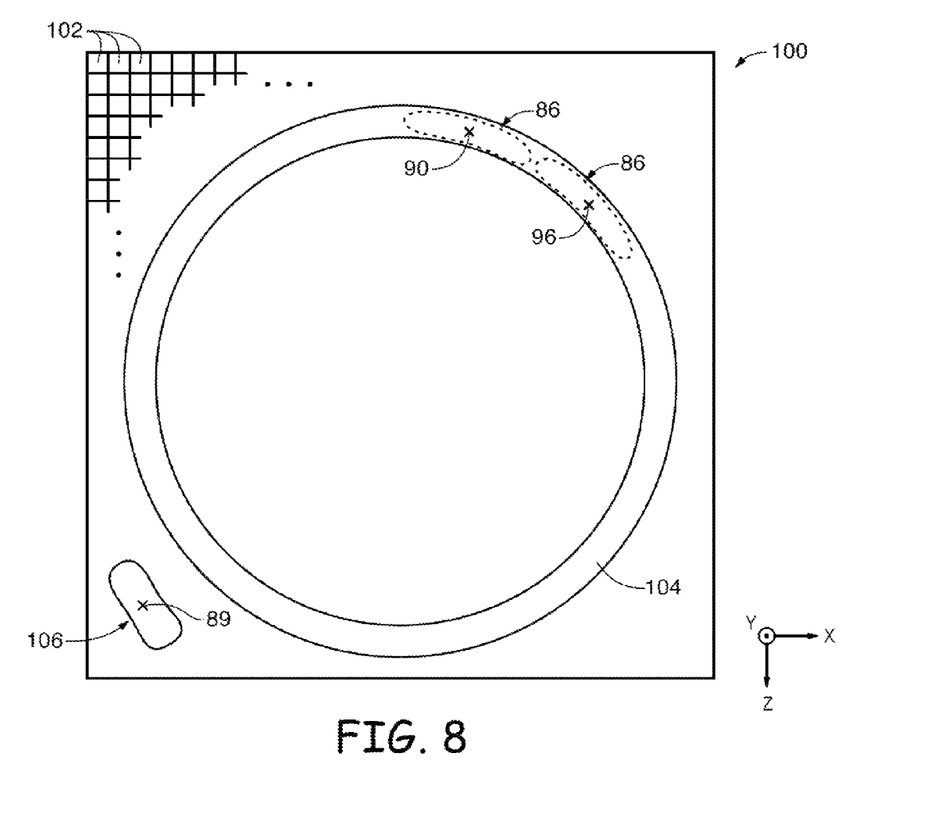
FIG. 8 is an illustrative diagram of an image flare map that may be generated using a calibration system of the type shown in FIG. 5 and loaded onto an imaging system for performing location-specific image flare mitigation operations in accordance with an embodiment of the present invention.

FIG. 8 is an illustrative diagram of a flare map that may be generated by calibration host 52 from image data received from image system 50. As shown in FIG. 8, host 52 may accumulate flare map 100 using image data 80 (FIG. 6), image data 92 (FIG. 7), and other image data generated by imaging system 50 in response to light received from light source 56 at locations across the field of view of imaging system 50. Flare map 100 may include flare mask values 102 that each correspond to a respective pixel location in the received image data. Mask values 102 may, for example, be greyscale values that correspond to the accumulated intensity of flare artifacts generated by imaging system 50 while capturing the image data. Flare map 102 may, for example, identify a respective coordinate location corresponding to each pixel value in the captured image data and an associated accumulated flare artifact intensity value. The accumulated flare artifact intensity value may correspond with the amount of flare artifact mitigation (e.g., color desaturation) that is to be performed at that coordinate location during image flare mitigation operations (e.g., while processing step 44 of FIG. 4). Flare map 100 may include metadata corresponding to each flare map value 102 that identifies the associated image capture settings, flare artifact color, etc.

As shown in FIG. 8, flare map 100 may include a first accumulated flare artifact 104 that is accumulated from rotationally symmetric flare artifact 86 in each image captured by imaging system 50. For example, flare artifact 86 centered at location 90 (FIG. 6), flare artifact 86 centered at location 96 (FIG. 7), and flare artifact 86 in other images captured by imaging system 50 may be form a disc shape when accumulated to form flare map 100 (e.g., due to the rotational symmetry of flare artifact 86 as a function of light source position). Flare map 100 may include accumulated flare artifact 106 that is accumulated from flare artifact 88 centered at location 89 in the image data. Since flare artifact 88 does not change position depending on the location of light source 56, accumulated flare artifact 106 may also be centered at position 89 in accumulated flare map 100.

Accumulated flare artifacts 104 and 106 may represent locations in the captured image data in which image flare artifacts can be formed by imaging system 50 during normal operation (e.g., in scenarios where flare map 100 is generated in response to light 60 received over all possible angles of incidence, any flare artifacts that are generated during normal device operation of imaging system 50 may be formed within the regions in the captured image data that correspond to the locations of accumulated flare artifacts 104 and 106 in flare map 100). Flare map 100 may be applied to image data captured by imaging system 50 during normal device operation when performing image flare mitigation operations. For example, imaging system 50 may perform image flare mitigation operations (e.g., pixel value desaturation, pixel value adjustments, etc.) within regions 106 and 104 of captured image data, thereby mitigating any image flare artifacts without generating color artifacts in regions of the image that are do not include flare artifacts.

Flare map 100 may correspond to a given set of image capture settings. For example, flare map 100 may be accumulated using image data captured by imaging system 50 using a particular set of image capture settings. In one suitable arrangement, host 52 may accumulate additional flare maps for each combination of image capture settings to ensure reliable image flare mitigation under a wide range of imaging conditions. In another suitable arrangement, host 52 may generate a single flare map 100 having normalized accumulated intensity values that account for the image capture settings with which the associated image data was captured (e.g., so that each flare map value 102 is normalized to a single exposure time, gain, and/or aperture setting). In this way, a single image flare map may be used by imaging system 50 to perform image flare mitigation operations. If desired, host 52 may store metadata associated with flare map 100 that identifies the associated image capture settings.

Figure 9:
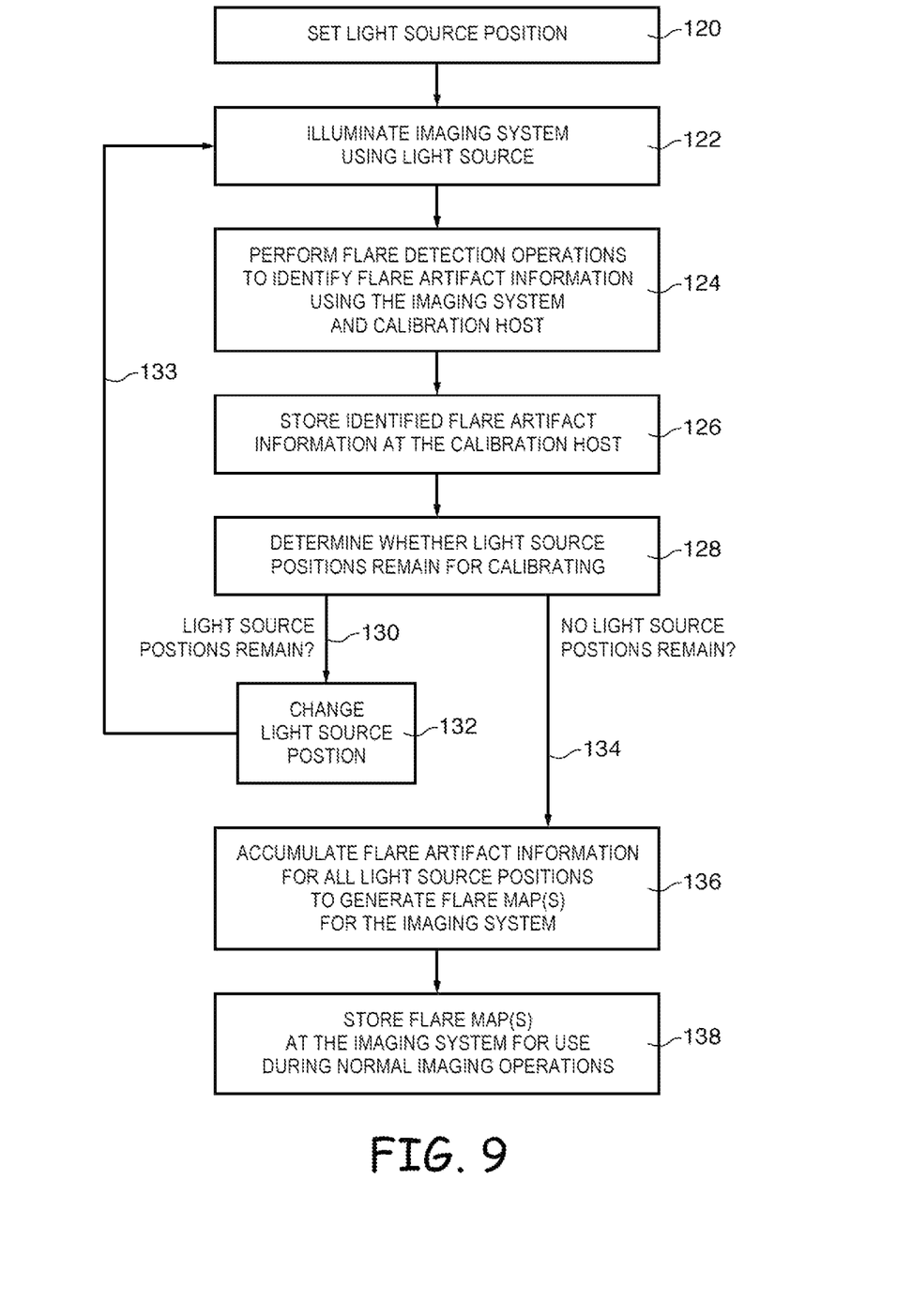
FIG. 9 is a flow chart of illustrative steps that may be performed by a calibration system of the type shown in FIG. 5 to generate image flare maps using identified image flare artifact parameters in accordance with an embodiment of the present invention.

FIG. 9 is a flow chart of illustrative steps that may be performed by calibration system 48 of FIG. 5 to generate one or more image flare maps to be used by imaging system 50 during normal device operations for performing location-specific image flare mitigation operations.

At step 120, the position of light source 56 (FIG. 5) may be set. For example, light source 56 may be set so that image light 60 is transmitted towards imaging system 50 at a desired incident angle $\theta$ and/or at a desired transverse angle $\phi$. In another suitable arrangement, imaging system 50 may be rotated with respect to image source 56 so that incoming light 60 is received by imaging system 50 at the desired angles $\theta$ and $\phi$. In another suitable arrangement, a particular image source 56 in an array of image sources 56 may be illuminated so that incoming light 60 is received by imaging system 50 at the desired incident angles.

At step 122, light source 56 may illuminate imaging system 50 with incoming light 60.

At step 124, imaging system 50 may capture image data in response to incoming light 60. Imaging system 50 may pass the captured image data to calibration host 52. Calibration host 52 may identify image flare artifacts and corresponding flare artifact information in the received image data. For example, calibration host 52 may identify location information, color information, and intensity information associated with each flare artifact in the received image data. Calibration host 52 may identify image capture settings with which the received image data was captured by imaging system 50.

At step 126, calibration host 52 may store the flare information for subsequent processing (e.g., for accumulation with flare information from additional image data).

At step 128, calibration host 52 may determine whether additional positions of light source 56 remain for calibrating (e.g., whether flare information has been identified for every desired position of light source 56). If additional light source positions remain for calibrating, processing may proceed to step 132 as shown by path 130.

At step 132, the position of light source 56 may be adjusted. For example, the position of light source 56 may be set so that incoming light 60 is received at an additional set of incident angles θ and ϕ for which flare artifact information has yet to be identified. Processing may subsequently loop back to step 122 via path 133 to identify flare artifact information for every possible position of light source 56 (e.g., to identify flare information across each possible angle of incoming light 60).

If no additional light source positions remain for calibrating, processing may proceed to step 136 as shown by path 134. At step 136, calibration host 52 may accumulate the flare information identified for each light source position to generate one or more flare maps for imaging system 50. For example, calibration host 52 may combine flare artifact location information, color information, and intensity information to generate a flare map such as map 100 of FIG. 8. The accumulated flare map may identify the location, color, and intensity of flare artifacts that may be generated by imaging system 50 during normal operation. If desired, the accumulated flare map may identify the image capture settings with which the corresponding image data was captured (e.g., so that flare map 100 includes normalized accumulated flare artifact intensity values that account for exposure, gain, and aperture settings with which the corresponding image data was captured).

At step 138, calibration host 52 may load the accumulated flare maps onto imaging system 50. Imaging system 50 may store the flare maps as calibration data 19 (FIG. 1). Imaging system 50 may subsequently perform image flare mitigation operations based on the stored flare maps during normal device operation (e.g., while performing the steps of FIG. 4). If desired, calibration host 52 may load the accumulated flare maps onto other imaging systems 50 (e.g., other imaging systems having the same design as imaging system 50). In this way, a single imaging device 50 may be calibrated using calibration system 48 to generate image flare maps for use on multiple imaging devices, thereby reducing manufacturing time and expense. In another suitable arrangement, each imaging system 50 that is to be manufactured in a manufacturing system may be calibrated using calibration system 48 (e.g., so that specific image flare maps are generated for each imaging system 50). In other words, calibration host 52 may generate image flare maps on a per-device basis (e.g., in which different image flare maps are generated for each imaging system 50) or on a per-design basis (e.g., in which a flare map is generated for a single imaging system 50 and provided to other imaging systems of the same design as imaging system 50).

Figure 10:
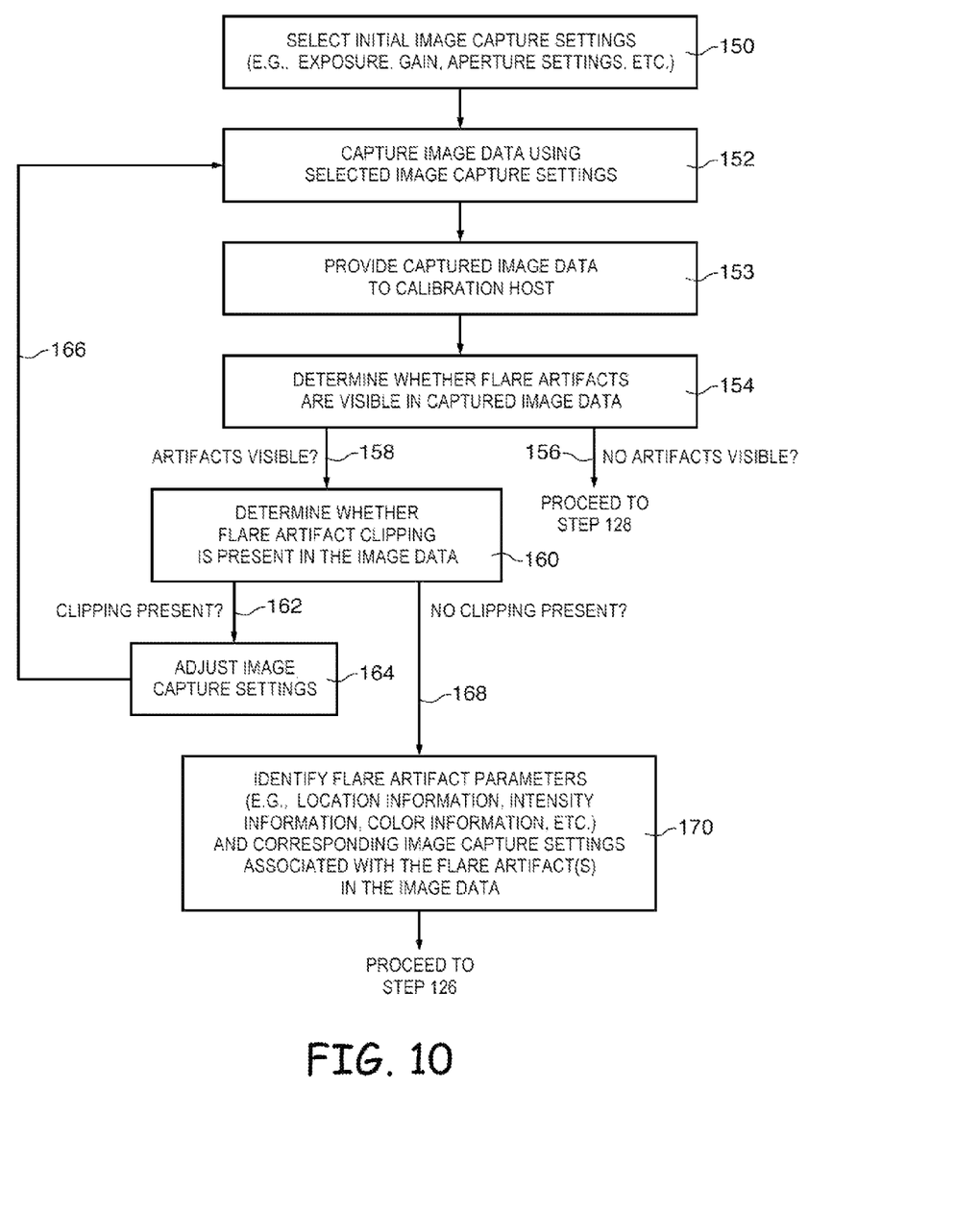
FIG. 10 is a flow chart of illustrative steps that may be performed by a calibration system of the type shown in FIG. 5 to identify image flare artifact parameters for generating image flare maps in accordance with an embodiment of the present invention.

FIG. 10 shows a flow chart of illustrative steps that may be performed by calibration system 48 of FIG. 5 for generating flare artifact information associated with the image data captured by imaging system 50. The steps of FIG. 10 may, for example, be performed by calibration system 48 while processing step 124 of FIG. 9.

At step 150, imaging system 50 may select initial image capture settings with which to capture images from light source 56. For example, imaging system 50 may select an initial gain, an initial exposure time, and an initial aperture size for capturing image data. If desired, imaging system 50 may select a maximum gain, exposure time, and/or aperture size so that a maximum amount of incoming light 60 is captured by imaging system 50. In this way, imaging system 50 may include any low intensity flare artifacts in the captured image data (e.g., so that flare artifacts of any intensity may be identified by calibration system 48). If desired, imaging system 50 may perform auto-exposure operations to determine the initial exposure time.

The dynamic range of an image may be defined as the luminance ratio of the brightest element in a given scene to the darkest element in the given scene. Typically, cameras and other imaging devices capture images having a dynamic range that is smaller than that of real-world scenes. High-dynamic-range (HDR) imaging systems are therefore often used to capture representative images of scenes that have regions with high contrast, such as scenes that have portions in bright sunlight and portions in dark shadows. An image may be considered an HDR image if it has been generated using imaging processes or software processing designed to increase dynamic range. If desired, imaging system 50 may be operated in a high dynamic range mode so that high dynamic range image data is captured. In this way, imaging system 50 may capture flare artifacts having any desired intensity such as low intensity flare artifacts that may not be visible without performing HDR imaging.

At step 152, imaging system 50 may capture image data (e.g., an image frame of pixel values) in response to incoming light 60. Imaging system 50 may capture the image data using the selected image capture settings.

At step 153, imaging system 50 may provide the captured image data to calibration host 52 (e.g., over path 54 as shown in FIG. 5).

At step 154, calibration host 52 may determine whether flare artifacts are visible in the captured image data. For example, calibration host 52 may be configured to detect color or brightness differences related to flare artifacts in the captured image. In general, calibration host 52 may use any desired flare artifact detection algorithm to detect image flares in the calibration data. If no flare artifacts are visible in the captured image frame, processing may proceed to step 128 of FIG. 9 (as shown by path 156) to select an additional light source position for calibrating.

If flare artifacts are visible in the captured image frame, processing may proceed to step 160 as shown by path 158. At step 160, calibration host 52 may determine whether clipping is present in the visible flare artifacts (e.g., whether one or more of the flare artifacts in the image data are clipped). If clipping is present in one or more of the visible flare artifacts, processing may proceed to step 164 as shown by path 162.

At step 162, calibration host 52 may instruct imaging system 50 to adjust the image capture settings with which the image frame was captured. For example, imaging system 50 may reduce the gain setting, exposure time setting (e.g., as long as the exposure time is longer than a minimum exposure time determined by periodic flickering of light source 56), and/or aperture size setting to reduce the intensity of one or more of the visible flare artifacts so that the flare artifacts are no longer clipped. Processing may subsequently loop back to step 152 to capture additional frames of image data with the reduced gain, exposure time, and/or aperture size settings. If no clipping is present in the captured image frame, processing may proceed to step 170 as shown by path 168.

At step 170, calibration host 52 may identify flare information associated with the visible flares in the image frame. For example, calibration host 52 may identify location information (e.g., pixel coordinates), intensity information, and/or color information associated with each visible flare artifact. The identified intensity information may, for example, be the maximum intensity that the image flare artifact can have without being clipped. Calibration host 52 may identify the image capture settings associated with the captured image frame (e.g., gain, exposure time, and aperture size settings). If desired, calibration host 52 may accumulate flare map 100 based on the identified image capture settings (e.g., to generate normalized flare map values 102 that account for gain, exposure time, and aperture size settings of imaging system 50). By identifying image capture settings, calibration system 48 may ensure that a normalized intensity level is recorded when generating image flare map 100 for each pixel location regardless of the exposure time, gain, and/or aperture settings used to capture the image data. Processing may subsequently proceed to step 126 of FIG. 9 to store the identified flare information and corresponding image capture settings.

The steps of FIG. 10 are merely illustrative. In general, any desired flare capture settings associated with the captured image data may be identified. If multiple flare artifacts having different intensities are present in a particular image frame, some or all of steps 152-170 may, if desired, be repeated to identify a maximum flare artifact intensity that is free from clipping for each of the flare artifacts. If desired, the steps of FIG. 10 may be performed entirely on imaging system 50 (e.g., using calibration circuitry formed on imaging system 50 without connecting imaging system 50 to a calibration host). If desired, flare map 100 may map to any desired color space (e.g., flare map 100 may be a luminance map, a single chrominance map, a U+V map, an RGB map, etc.)

Figure 11:
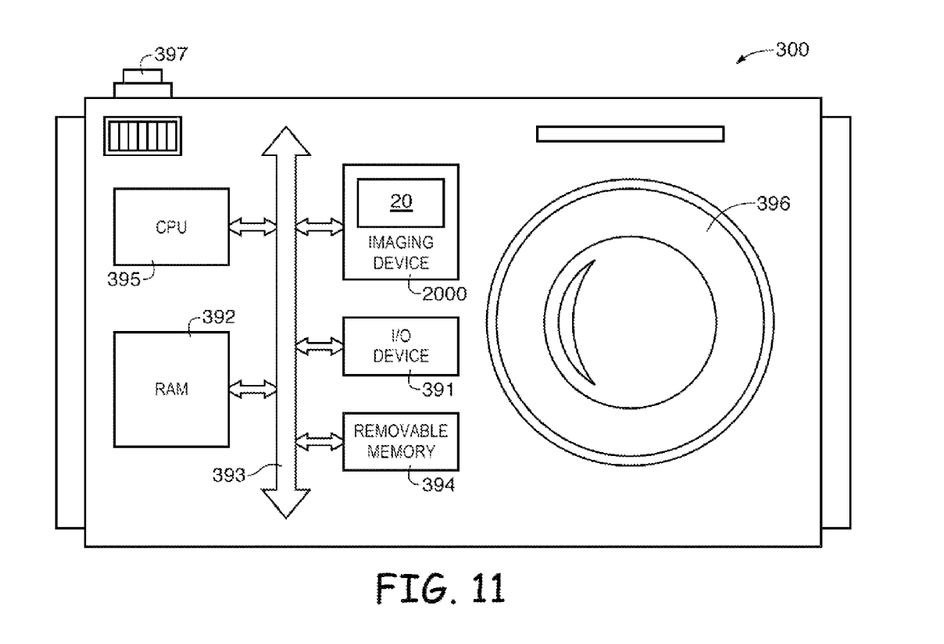
FIG. 11 is a block diagram of a processor system employing the embodiments of FIGS. 1-10 in accordance with an embodiment of the present invention.

FIG. 11 shows in simplified form a typical processor system 300, such as a digital camera, which includes an imaging device 2000 (e.g., an imaging device 2000 such as device 10 of FIGS. 1-10 and the techniques for generating image flare calibration data and performing image flare mitigation operations as described above). The processor system 300 is exemplary of a system having digital circuits that could include imaging device 2000. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 20 of device 2000 when a shutter release button 397 is pressed, central processing unit (CPU) 395, such as a microprocessor which controls camera and one or more image flow functions, which communicates with one or more input/output (I/O) devices 391 over a bus 393. Imaging device 2000 also communicates with the CPU 395 over bus 393. The system 300 also includes random access memory (RAM) 392 and can include removable memory 394, such as flash memory, which also communicates with CPU 395 over the bus 393. Imaging device 2000 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating imaging systems and methods of operating image systems having calibration data that identifies one or more image flare maps for mitigating the effects of image flare produced in the imaging system.

An imaging system may include a camera module with an array of image sensor pixels, processing circuitry, and one or more lenses that focus light onto the array of image sensor pixels. Stray light that enters the camera module may generate image flare artifacts in captured images. At least one image flare map may be stored as calibration data on the processing circuitry. The array of image sensor pixels may capture image data and the processing circuitry may perform location-specific image flare mitigation operations such as pixel desaturation operations on the captured image data based on the image flare map.

The image flare map may identify the probability that various portions (e.g., pixel value locations) of the image data will include image flare artifacts. The image flare map may characterize all possible image flare artifacts that can be generated by the imaging system. The processing circuitry may identify a portion of the captured image data on which to perform the image flare mitigation operations based on the identified image flare map. For example, the processing circuitry may identify a portion (subset) of the captured image data that has a probability of including image flare artifacts that is exceeds a threshold probability based on the identified image flare map, and the processing may perform image flare mitigation operations on that identified portion of the captured image data.

If desired, the image flare map may include a greyscale map of greyscale values (e.g., greyscale values having greyscale magnitudes ranging from zero (black) to one (white)). The greyscale magnitudes may, for example, correspond to the amount of image flare mitigation that is to be performed on corresponding pixel values in the captured image data. The greyscale map may include a first portion that has a first greyscale magnitude and that corresponds to a first set of pixel values in the captured image data. The greyscale map may include a second portion that has a second greyscale magnitude that is less than the first greyscale magnitude and that corresponds to a second set of pixel values in the captured image data. The processing circuitry may apply a first amount of desaturation to the first set of pixel values and a second amount of desaturation that is less than the first amount of desaturation to the second set of pixel values (e.g., because the second greyscale magnitude is less than the first greyscale magnitude).

The image flare map may be generated using a calibration system. The calibration system may include a light source and a test host coupled to the imaging system. The imaging system may capture image data from the light source at multiple positions relative to the imaging system (e.g., for light received by the imaging system at all possible angles of incidence). The test host may generating an image flare map by combining image flare artifact information associated with different images captured by the imaging system in response to light received from the light source when placed at different locations relative to the imaging system. The test host may adjust image capture settings with which the imaging system captures the image data and may adjust the light source position so that each possible image flare artifact that can be generated by the imaging system is characterized and accumulated in the image flare map. The image flare map may be used by the imaging system during normal imaging operations to mitigate image flare artifacts without generating color artifacts at portions of the captured image data that do not include flare artifacts.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for operating an imaging system having a plurality of image sensor pixels and processing circuitry, the method comprising:
    with the plurality of image sensor pixels, capturing image data, wherein the imaging system uses adjustable image capture settings when capturing the image data;
    with the processing circuitry, identifying an image flare map to be used based on the adjustable image capture settings used when capturing the image data; and
    with the processing circuitry, performing image flare mitigation operations on the captured image data based on the identified image flare map.

2. The method defined in claim 1, wherein performing the image flare mitigation operations comprises:
    identifying a portion of the captured image data on which to perform the image flare mitigation operations based on the identified image flare map.

3. The method defined in claim 2, wherein performing the image flare mitigation operations further comprises:
    performing the image flare mitigation operations on the identified portion of the captured image data.

4. The method defined in claim 3, wherein the image data comprises a plurality of pixel values and wherein performing the image flare mitigation operations on the identified portion of the captured image data comprises:
    replacing at least one pixel value in the identified portion of the captured image data with a modified pixel value.

5. The method defined in claim 1, wherein the identified image flare map comprises a greyscale map of probability values and wherein performing the image flare mitigation operations comprises:
    performing the image flare mitigation operations on the captured image data based on the greyscale map.

6. The method defined in claim 5, wherein the captured image data comprises a plurality of pixel values, wherein the greyscale map comprises a first portion having a first greyscale magnitude and a second portion having a second greyscale magnitude that is less than the first greyscale magnitude, wherein a first set of pixel values in the plurality of pixel values correspond with the first portion of the greyscale map, wherein a second set of pixel values in the plurality of pixel values correspond with the second portion of the greyscale map, and wherein performing the image flare mitigation operations comprises:
    applying a first amount of desaturation to the first set of pixel values; and
    applying a second amount of desaturation that is less than the first amount of desaturation to the second set of pixel values.

7. The method defined in claim 1, wherein the captured image data comprises an image frame of pixel values, wherein the image flare map identifies a set of pixel values in the image frame that have a probability of including image flare artifacts that exceeds a threshold probability, and wherein performing the image flare mitigation operations based on the identified image flare map comprises:
    performing image flare mitigation operations on the identified set of pixel values.

8. The method defined in claim 1, further comprising:
    with the processing circuitry, storing image flare calibration data; and
    with the processing circuitry, retrieving the image flare map from the stored image flare calibration data.

9. A method for calibrating an imaging system using a calibration system, wherein the calibration system comprises a light source and a test host coupled to the imaging system, the method comprising:
    with the imaging system, capturing image data from the light source;
    with the test host, generating an image flare map using the captured image data; and
    with the test host, loading the generated image flare map onto the imaging system.

10. The method defined in claim 9, further comprising:
    placing the light source at a first location relative to the imaging system;
    with the imaging system, capturing a first set of image data from the light source at the first location;
    placing the light source at a second location relative to the imaging system; and
    with the imaging system, capturing a second set of image data from the light source at the second location.

11. The method defined in claim 10, further comprising:
    with the test host, identifying a first set of image flare artifact parameters associated with the first set of image data;
    with the test host, identifying a second set of image flare artifact parameters associated with the second set of image data; and
    with the test host, combining the identified first and second sets of image flare artifact parameters to generate the image flare map.

12. The method defined in claim 11, wherein the first set of image flare artifact parameters comprises a first image flare artifact location, wherein the second set of image flare artifact parameters comprises a second image flare artifact location, and wherein combining the first and second sets of image flare artifact parameters comprises:
    combining the first and second image flare artifact locations to generate the image flare map.

13. The method defined in claim 10, wherein capturing the first set of image data from the light source comprises:
    capturing an image from the light source at the first position using a set of image capture settings.

14. The method defined in claim 13, wherein the set of image capture settings comprise at least one image capture setting selected from the group consisting of: an exposure setting, a gain setting, and an aperture setting.

15. The method defined in claim 13, further comprising:
    with the test host, determining whether an image flare artifact is visible in the captured image; and
    in response to determining that the image flare artifact is visible in the captured image, determining whether image flare artifact clipping is present in the captured image using the test host.

16. The method defined in claim 15, further comprising:
    with the test host, instructing the imaging system to capture a second image from the light source at the first position using an additional set of image capture settings in response to determining that the image flare artifact clipping is present in the captured image.

17. The method defined in claim 9, wherein capturing the image data from the light source comprises:
    capturing the image data from the light source using a high-dynamic-range imaging mode.

18. A system, comprising:
a central processing unit;
memory;
input-output circuitry; and
an imaging device, wherein the imaging device comprises:
- an array of image sensor pixels configured to capture image data;
- a lens that focuses an image on the array;
- storage and processing circuitry; and
- calibration data stored at the storage and processing circuitry, wherein the storage and processing circuitry is configured to identify an image flare mask in the calibration data based on detected image capture settings of the imaging device, and wherein the storage and processing circuitry is configured to perform location-specific image flare mitigation operations on the captured image data based on the identified image flare mask.

19. The system defined in claim 18, wherein the captured image data comprises a plurality of pixel values at respective pixel value locations, wherein the identified image flare mask identifies selected pixel value locations in the captured image data for performing the location-specific image flare mitigation operations, and wherein the storage and processing circuitry is configured to perform the location-specific image flare mitigation operations at the selected pixel value locations in the captured image data.

20. The system defined in claim 19, wherein the storage and processing circuitry is configured to perform pixel value desaturation operations only at the selected pixel value locations in the captured image data.

* * * * *